Oct. 26, 1937.  M. M. FROCHT  2,096,964
TESTING APPARATUS
Filed May 28, 1934  6 Sheets-Sheet 2

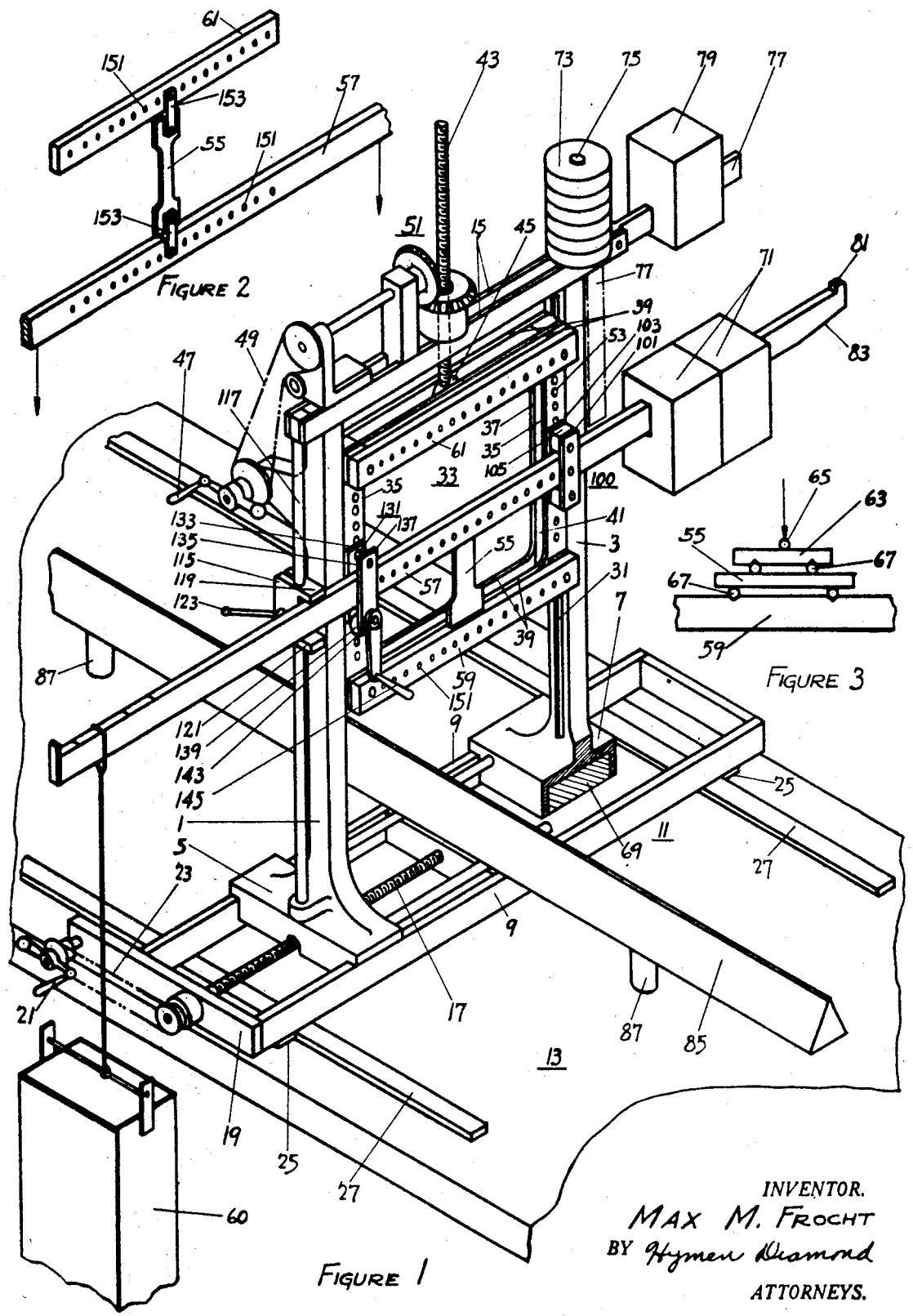

INVENTOR.
MAX M. FROCHT
BY Hymen Diamond
ATTORNEYS.

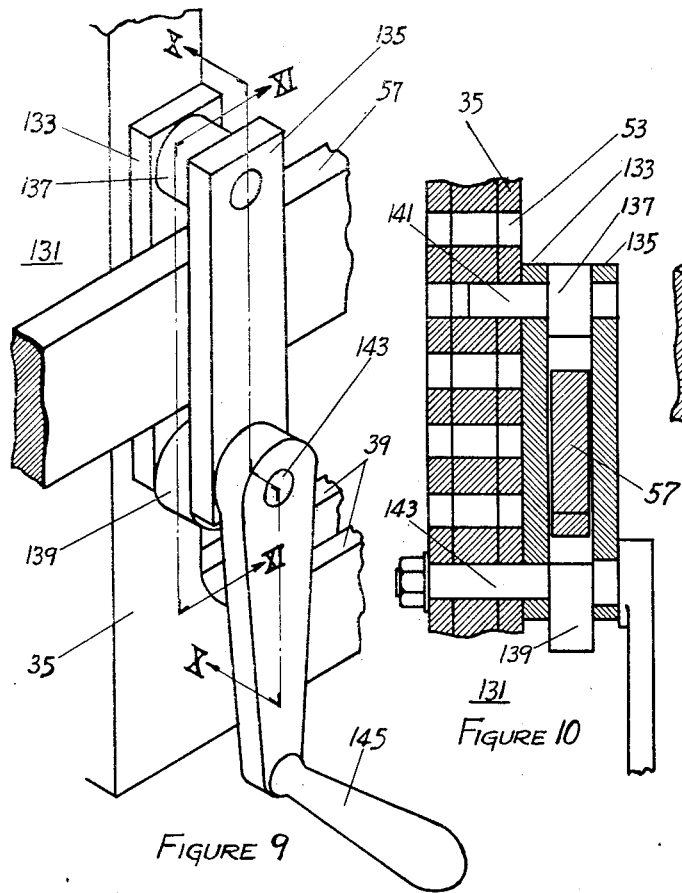
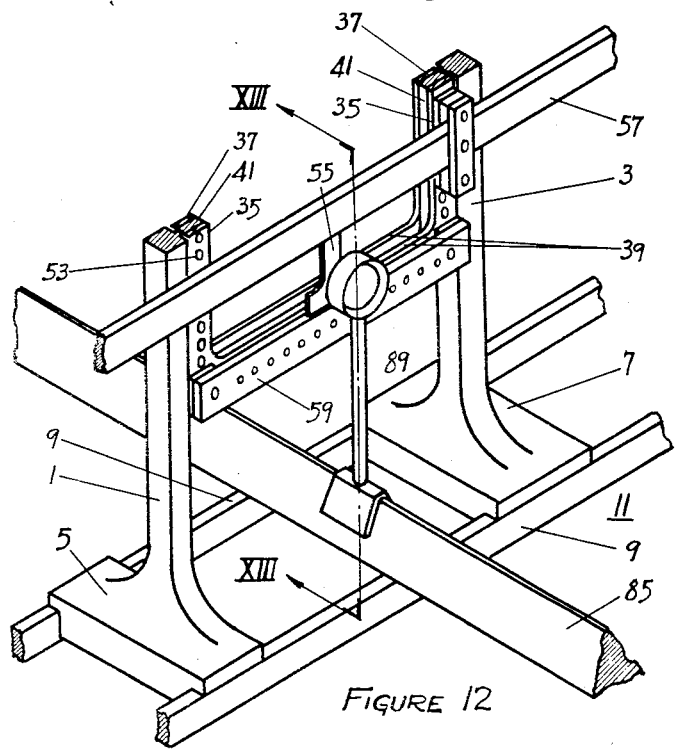
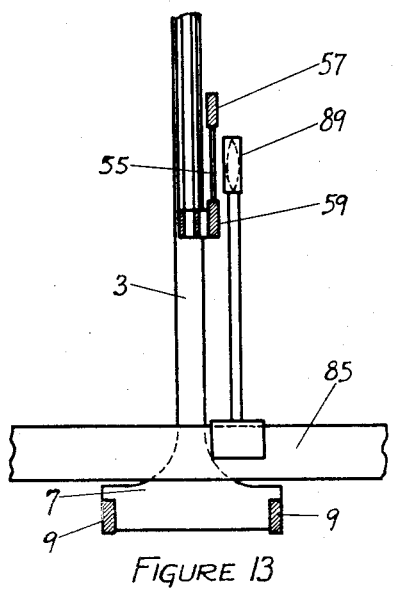

Oct. 26, 1937. M. M. FROCHT 2,096,964
TESTING APPARATUS
Filed May 28, 1934   6 Sheets-Sheet 4
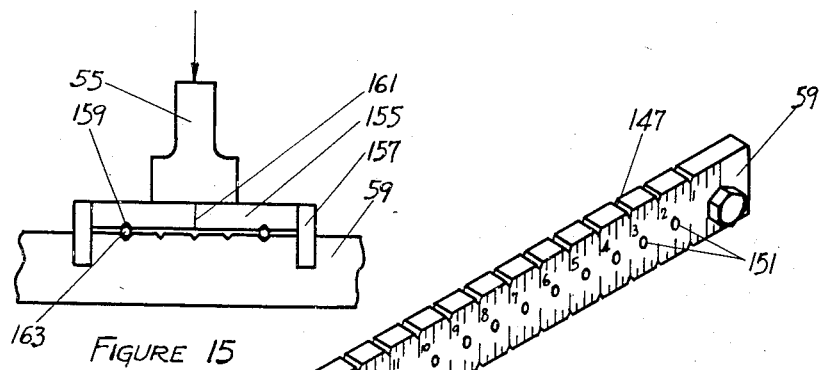
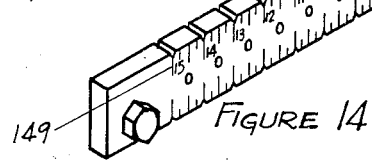
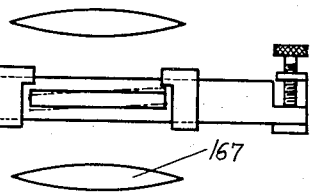
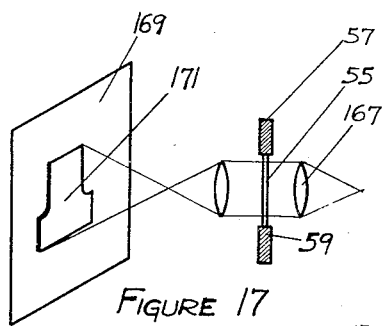
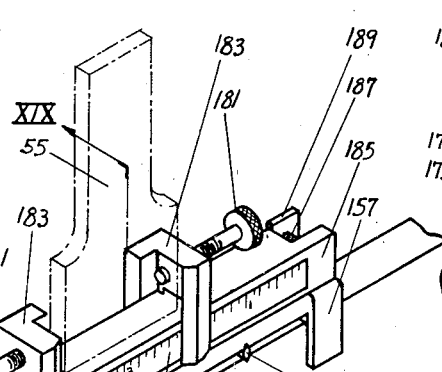
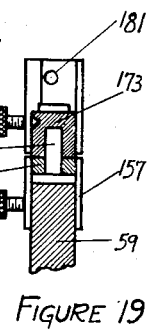
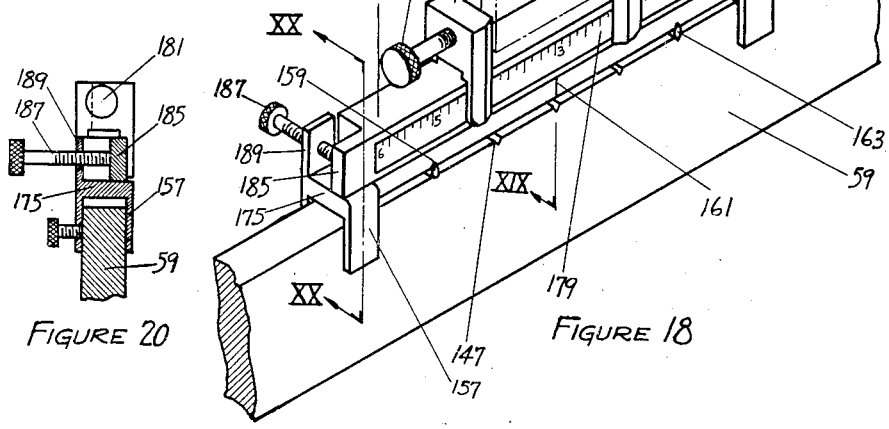
INVENTOR.
MAX M. FROCHT.
BY Hymen Diamond
ATTORNEYS.

Oct. 26, 1937.  M. M. FROCHT  2,096,964
TESTING APPARATUS
Filed May 28, 1934    6 Sheets-Sheet 5
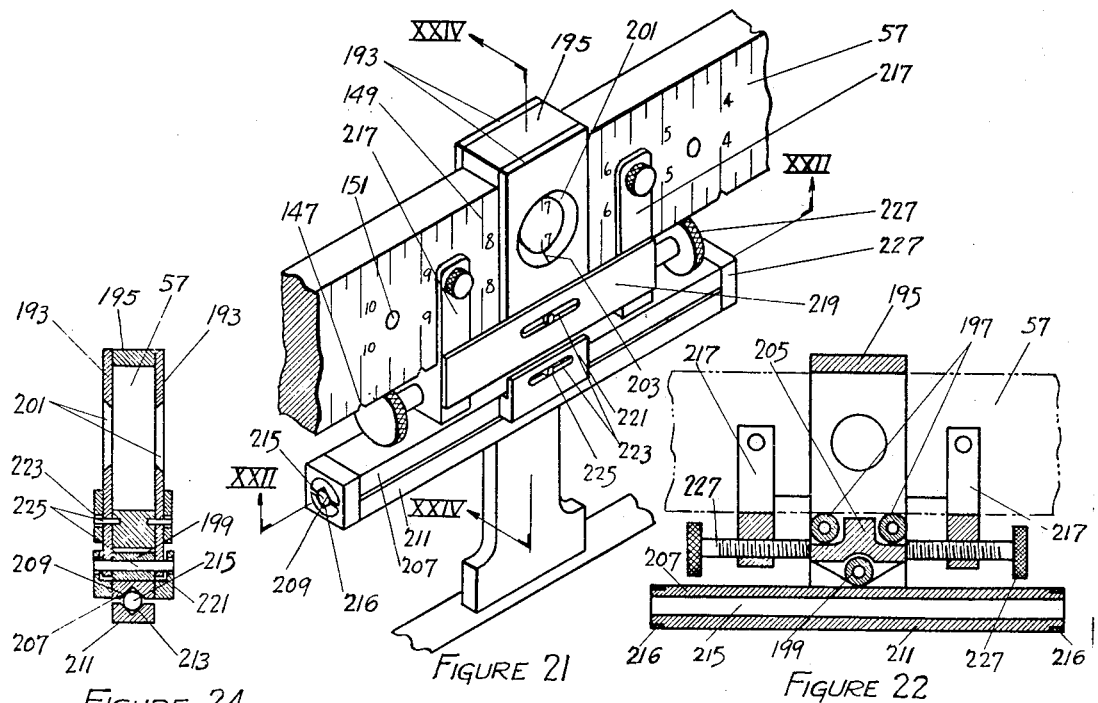
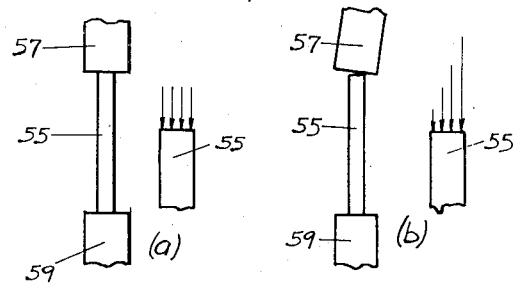
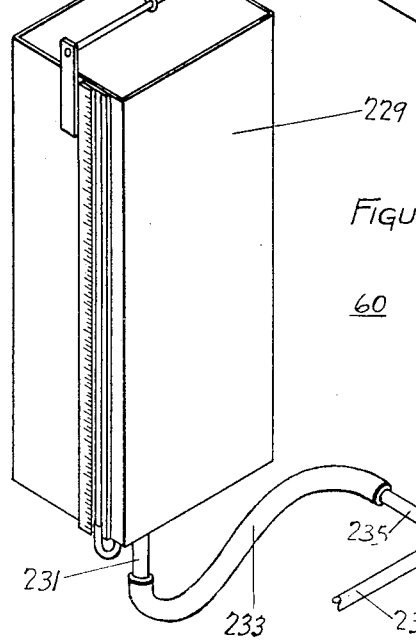
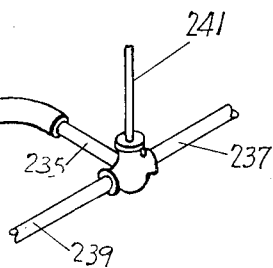
INVENTOR.
MAX M. FROCHT.
BY Hymen Diamond
ATTORNEYS.

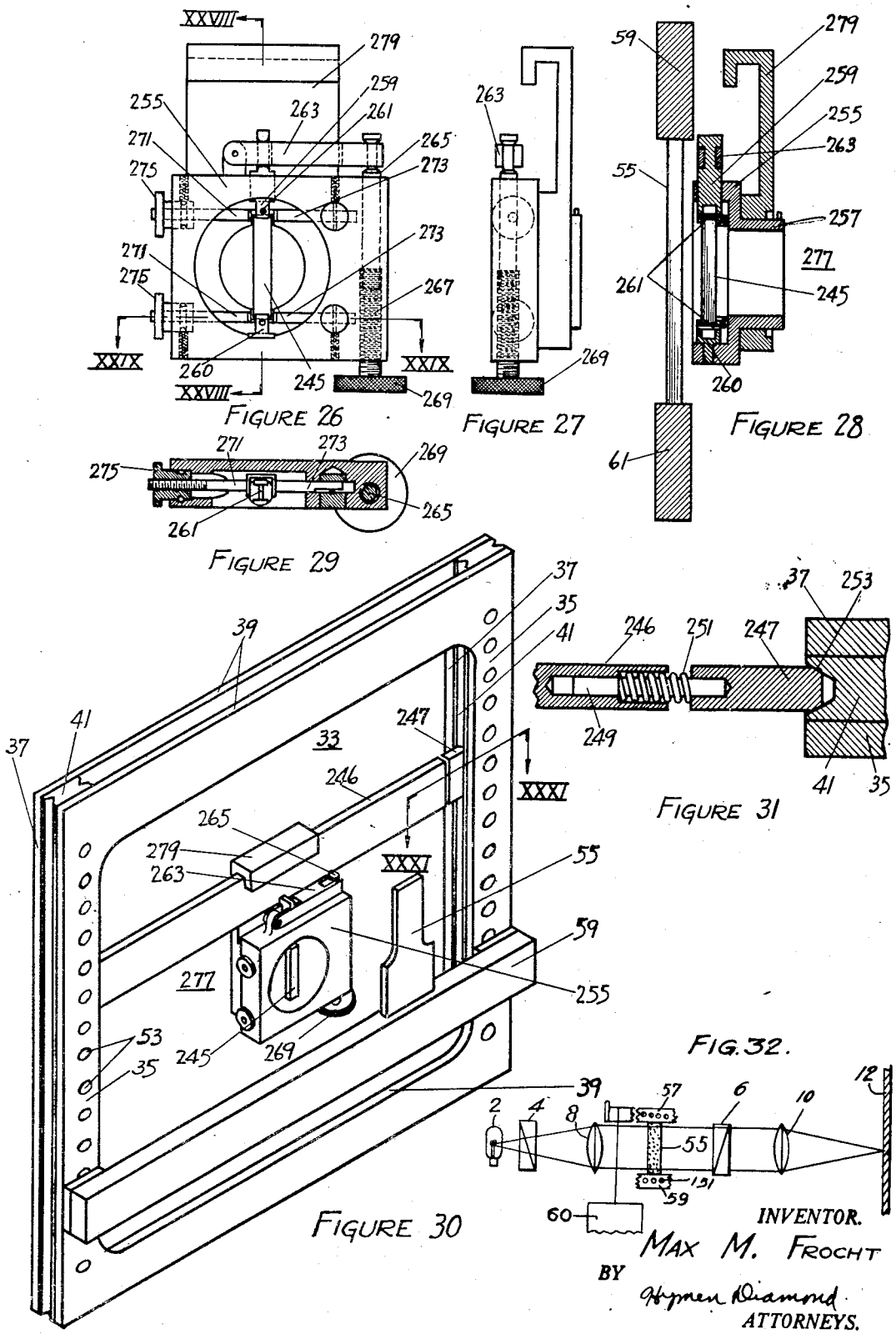

Patented Oct. 26, 1937

2,096,964

UNITED STATES PATENT OFFICE 2,096,964

TESTING APPARATUS

Max M. Frocht, Pittsburgh, Pa.

Application May 28, 1934, Serial No. 727,898

10 Claims. (Cl. 88—14)

My invention relates to testing apparatus and has particular relation to photoelastic testing machines.

It is an object of my invention to provide a simple and tractable photoelastic testing machine.

An ancillary object of my invention is to provide photoelastic apparatus for producing a well-defined photoelastic photograph of an element under test.

Another ancillary object of my invention is to provide for a photoelastic testing machine apparatus for adjusting the normality of the surface which is to be photographed with reference to the beam of radiant energy whereby the photograph is to be produced with a high degree of accuracy.

A further ancillary object of my invention is to provide in photoelastic testing apparatus contrivances for making certain that the forces applied to the element under test are applied along symmetry lines of the element and are uniformly applied along these lines.

A still further ancillary object of my invention is to provide in a photoelastic testing machine simple apparatus for determining the polarity of the stresses at various isolated points of an element under test.

Still another ancillary object of my invention is to provide a method for producing photoelastic photographs of an element under test in which the fringes shall show as dark lines on a light background.

More concisely stated, it is an object of my invention to provide a testing machine that shall be capable of adjustment with facility and with which it shall be possible to produce photoelastic photographs that are capable of yielding highly accurate quantitative information covering the stresses applied to an element under test.

According to my invention I provide a testing machine comprising a vertical supporting structure on which a rectangular frame is slidably supported. A beam is pivotally supported in a central position on the frame and, when gravitational forces are applied to the one end thereof, cooperates with another beam supported below it or a third beam supported above it to apply respectively compressional or tensional forces to an element disposed between the beams in accordance with the manner in which the element is mounted. The gravitational load may be of the hydraulic type provided by varying the amount of a fluid such as water in a container supported on the beam. The amount of fluid in the container may be varied continuously and if necessary motion pictures can be taken of the element under test as the weight of the water in the container is continuously varied. The beam to which the gravitational forces are applied is preferably supported by pins projecting into conical bearings milled in its surface.

In utilizing the machine for photoelastic analysis, an optical system is provided to cooperate with it. The optical system is preferably composed of a suitable source of radiations, polarizing and analyzing elements such as "Nicol" prisms, collimating and focusing lenses, and a screen for observing the images produced or a camera mechanism of the usual type for producing photographs of the element under test.

In the preferred practice of my invention the radiations are polarized, collimated, and transmitted through the element under test. The surface of the element which is to be analyzed is disposed normal to the collimated radiations. The radiations are then transmitted through the analyzer and focused on the screen or photographic plate. Stresses in the element under test are manifested by fringes arranged in a predetermined manner about certain centers of stress. Under certain situations the radiations transmitted through the element under test and the crystals are circularly polarized rather than plane polarized. If circularly polarized radiation is desired, quarter wave plates are associated with the polarizing and analyzing elements; and the radiation is transmitted in succession through the quarter wave plates and the polarizing and analyzing elements.

In practicing my invention I provide various contrivances for adjusting the position of the element in such manner that it is normal to the optical beam whereby the photoelastic photographs are produced. Contrivances are also provided for making certain that the stresses are uniformly applied to the element under test.

The polarity of the stresses at a point in the element under test may be determined by juxtaposing a second element to the point under consideration and stressing the latter element preferably by compressional forces. When the beam of radiant energy modified by the principal element alone and then modified by both elements is observed, a determination of the polarity of the stresses can be made from the observations.

If the polarizing and analyzing elements are set to entirely extinguish an unmodified ray or are crossed and if the auxiliary stressed element modifies the radiations transmitted through the beam in such manner to compensate for the stress of the principal element, no light will be transmitted through the analyzing crystal and a dark point will be projected on an observation screen. If a dark point is observed and the auxiliary element is under compression, it is apparent that the point under observation must be under tension in a direction parallel to the direction of the stress in the auxiliary element and under compression in a direction normal to the direction of the stress in the auxiliary element. Compression at the point under observation in the parallel direction and tension in the normal direction is manifested by an increase in radiation transmitted through the analyzing crystal.

In practicing my invention I prefer at times to produce a photoelastic photograph in which the fringes resulting from the stresses impressed upon the element under stress appear dark on a light background in the positive print. Such a photograph is produced by setting the analyzing crystal in such manner that it transmits the unmodified polarized radiations rather than absorbing them; i. e., the crystals are placed parallel to each other and the quarter wave plates parallel to each other.

It will be understood that the properties of the materials tested photoelastically are determined by calculating the stresses from the known forces applied to the material and their moment arms and combining these values with certain other values derived by observing the stress patterns, counting the fringes, noting the order of the fringes, etc. In practicing my invention I produce photographic prints of the stress patterns and make pattern calculations from these rather than from the optic images of the patterns.

The novel features that I consider characteristic of my invention are set forth with particularity in the appended claims. The invention itself, however, both as to its organization and its method of operation, together with additional objects and advantages thereof, will best be understood by the following description of a specific embodiment, when read in connection with the accompanying drawings in which:

Figure 1 is a view in perspective showing the essential elements of a preferred embodiment of my invention as it is utilized to apply compression stresses;

Fig. 2 is a view in perspective illustrating how my invention may be utilized to apply tension to an element under test;

Fig. 3 is a view in front elevation illustrating how my invention may be applied to the analysis of bending;

Fig. 9 is a view in perspective illustrating a further feature of my invention;

Fig. 10 is a view in section taken along the line X—X of Fig. 9;

Fig. 11 is a view in section taken along the line XI—XI of Fig. 9;

Fig. 12 is a view in perspective illustrating still another feature of my invention;

Fig. 13 is a view in section taken along the line XIII—XIII of Fig. 12;

Fig. 14 is a view in perspective showing a beam utilized in the practice of my invention;

Fig. 15 is a view in front elevation showing how an element under test is adjusted on the compression beam in accordance with the practice of my invention;

Fig. 16 is a view in top elevation illustrating how the element under test is aligned with the optical system in accordance with the practice of my invention;

Fig. 17 is a diagrammatical view utilized in showing how the optical adjustment is made in accordance with the practice of my invention;

Fig. 18 is a view in perspective showing the assembly of the compression beam and the element under test as it is mounted in the preferred practice of my invention;

Fig. 19 is a view in section taken along the line XIX—XIX of Fig. 18;

Fig. 20 is a view in section taken along the line XX—XX in Fig. 18;

Fig. 21 is a view in perspective illustrating the manner in which the stresses impressed on the element under test are equalized in accordance with the practice of my invention;

Fig. 22 is a view in vertical section taken along the line XXII—XXII of Fig. 21;

Fig. 23 is a diagrammatical view illustrating the application of equalized and unequalized stresses to an element under test;

Fig. 24 is a view in section taken along the line XXIV—XXIV of Fig. 21;

Fig. 25 is a view in perspective showing the apparatus utilized for applying hydraulic forces to the stressing beam;

Fig. 26 is a view in front elevation showing the apparatus whereby the polarity of the stresses at a point in the element under test may be determined;

Fig. 27 is a view in end elevation of the element shown in Fig. 26;

Fig. 28 is a view in section taken along the line XXVIII—XXVIII in Fig. 26;

Fig. 29 is a view in section taken along the line XXIX—XXIX of Fig. 26;

Fig. 30 is a view in perspective showing the manner in which the polarity determining element is mounted in the main assembly;

Fig. 31 is a view in section taken along the line XXXI—XXXI of Fig. 30; and

Fig. 32 is a schematic view showing the optical system utilized in the practice of my invention.

Figure 5:
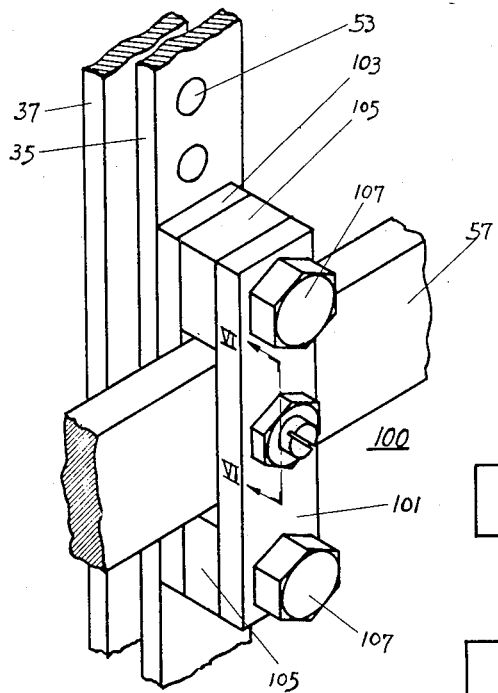
Fig. 5 is a view in perspective showing the feature of my invention which relates to Fig. 4.
Figure 6:
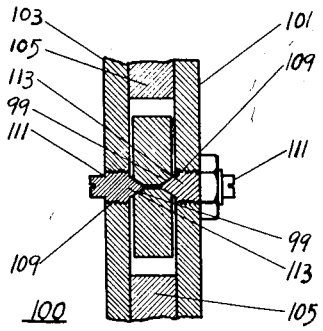
Fig. 6 is a view in section taken along the line VI—VI of Fig. 5.

The apparatus shown in the drawings comprises a plurality of vertical uprights 1 and 3 equipped with supports 5 and 7 which extend in a plane perpendicular to the uprights and which are capable of sliding along opposite sides 9 of a rectangular framework 11 which together with the supports rests on a table 13. The uprights 1 and 3 are held together by a plurality of parallel cross-bars 15 secured near the upper ends to the opposite faces thereof; and the upright assembly thus formed may be moved along the sides 9 of the rectangular framework 11 by the rotation of an elongated, threaded shaft 17 which engages one of the supports 5 and is secured in a plate 19 forming one end of the framework. To operate the threaded shaft 17 a manually operable crank 21 coupled to the bar through a chain or belt 23 is provided. The rectangular framework 11 is provided with a plurality of plates 25 which project downward near its ends and engage a plurality of tracks 27 along which the assembly including the uprights 1 and 3 may be moved in a direction perpendicular to the direction in which the uprights may be moved along the rails 9.

Each of the uprights 1 and 3 is provided along its inner surface with a projection 31 of V section, and a rectangular frame 33 is slidably mounted between the projections. The rectangular frame 33 is composed of two sets of vertical plates 35 and 37 and two sets of horizontal plates 39. The vertical plates 35 and 37 are separated by blocks 41 extending in a direction parallel thereto and the vertical and horizontal plates are secured to the blocks. The rectangular frame 33 is thus composed of two parallel rectangles separated by the blocks 41. The blocks 41 are provided with V grooves which engage the V projections 31.

A threaded shaft 43 passing through a nut in one of the bevel gears in assembly 51 extends between the cross plates 15 of the upright assembly and is joined to the frame 33 by means of an eye bolt 45. The frame 33 may be adjusted to any desired vertical position by rotating the threaded shaft 43 from a manually operable handle 47 which is coupled thereto through a chain or belt 49 and a system of bevel gears 51.

It is seen that by the operation of the manually operable cranks 21 and 47 and by sliding the supporting framework 11 along the tracks 27 engaged thereby, the rectangular framework may be adjusted in any desired position. The vertical arms of the rectangular frame 33 are provided with openings 53 which are preferably uniformly spaced along the front vertical plates 35 thereof. The frame 33 is, moreover, of such dimensions that the perforated plates 35 are either flush with or extend beyond the faces of the uprights 1 and 3.

While my invention has particular applicability in the photoelastic field, it may also be applied, to a limited extent, for the general purpose of stressing materials and observing their mechanical properties under stress. Accordingly, in the latter case, when my invention is applied generally, the element 55 that is to be tested may be constructed of a material of any type. Metals such as steel may be used as well as wood or glass, and the property of transparency to radiant energy is not essential. On the other hand, when my invention is applied exclusively in the photoelastic investigation, the material utilized must be transparent to the radiant energy selected for carrying out the investigation. Accordingly in this case, the element 55 may be constructed of glass, celluloid, various phenolic condensation products, such as bakelite, and other materials of similar character.

The element 55 is mounted in the frame 33 between a plurality of beams 57 and 59 by the operation of which stresses are applied thereto. In accordance with the preferred practice of my invention the stresses are applied to the element 55 under test by the application of gravitational forces 60 to the beam 57 which is centrally mounted on the frame 33 and which extends beyond the frame and the uprights 1 and 3. The element 55 may be compressed between the central beam 57 and the beam 59 supported below the central beam as shown in Fig. 1. It may, moreover, be tensioned by being engaged with the central beam 57 and with a beam 61 secured above the central beam as shown in Fig. 2. Finally bending may be applied to the element 55 by supporting the element on the lower beam 59, supporting a suitable plate 63 on the element 55, supporting a pin 65 on the plate 63 and causing the central beam 57 to exert a force on the pin. To provide for the proper application of the forces to the beam, pins 67 are inserted between the element 55 and the lower beam 59 and between the element 55 and the plate 63.

The upper and lower beams 59 and 61 are mounted in the openings 53 in the frame 33 by means of pins or bolts. Their position with regard to each other and with regard to the central beam 57 may be changed with facility by removing them from one set of holes and mounting them in another set. By supporting one end of a beam 59 or 61 in two holes at different levels an element having an oblique rather than a horizontal end may be subjected to the stresses involved.

The frame 33 is customarily mounted vertically. Consequently, if pins are utilized to support such members as the beams 59 and 61, they traverse the openings 53 horizontally and are prevented from sliding out of the openings by the weight of the beams. Where there is excessive vibration and consequent danger of the pins sliding out in spite of the pressure exerted by the elements supported, threaded bolts may be used. The bolts traverse the openings 53 in which the members are supported and engage nuts (not shown) on the opposite face of the frame 33.

By reason of the fact that loads 60 are applied to the central beam 57 which may be of considerable magnitude, it is essential that the system be counterbalanced to prevent the upright assembly from toppling from its support. It is also essential that the weight of the beam and the elements on which the load 60 is supported be counterbalanced.

These objects are accomplished, first, by loading the upright support 7 most remote from the end of the beam 57 on which the load 60 is mounted with a heavy material 69 such as lead. Further, suitable weights 71 are mounted on that end of the central beam 57 that is remote from the end on which the load 60 is mounted. Again weights 73 are mounted on a rod 75 extending from the top of the upright 3 most remote from the load 60; finally, a bar 77 is provided which is pivoted between the plates 15 extending between the uprights 1 and 3 and which normally hangs in a direction parallel to the uprights, but which may be raised to a horizontal position and held there by a spring mechanism (not shown) and on which counterbalancing weights 79 may be supported.

The counterbalancing weights 71 mounted on the loaded beam 57 are usually provided with openings that are somewhat wider than the width of the beam. Since it is desirable that the weights 71 be capable of being mounted on the beam and removed from the beam with facility, the beam is equipped with a projection 81 which extends from its upper edge. The lower edge 83 of the beam in the region of the projection 81 is milled away sufficiently to enable the operator to slide the counterbalancing weights 71 on to the beam with facility. After the weights are mounted on the beam, they settle on the upper edge and are prevented from falling by the upwardly extending projection 81.

In utilizing the machine for photoelastic analysis, an optical system is provided to cooperate with it. The optical system is illustrated in Fig. 32 and is composed of a suitable source of radiations, 2 polarizing and analyzing elements such as "Nicol" prisms, 4 and 6 respectively, collimating and focussing lenses, 8 and 10 respectively, and a screen 12 for observing the images produced.

In the preferred practice of my invention the radiations are polarized, collimated, and transmitted through the element under test 55. The surface of the element which is to be analyzed is disposed normal to the collimated radiations. The radiations are then transmitted through the analyzer 6 and focussed on the screen 12 or on a photographic plate. Stresses in the element under test are manifested on the image or photograph by fringes arranged in a predetermined manner about certain centers of stress.

The optical elements which in general include the above-mentioned polarizing and analyzing prisms 4 and 6 and collimating and focussing lenses 8 and 10 are mounted on a bar 85 of triangular cross-section which is supported on a plurality of pegs 87 above the rectangular framework 11 on which the upright supports 1 and 3 slide. By reason of the fact that the optical bench 85 is thus mounted above the framework 11, the lens 89 or other optical elements may be brought immediately adjacent to the object under test, as is shown in Figs. 12 and 13; and optical adjustment may be made with facility.

The central beam 57 on which the gravitational load 60 is supported is pivotally mounted. However, a careful analysis of the problems involved in photoelastic work will reveal that considerable care must be given to the proper pivoting of the beam.

Figure 4:
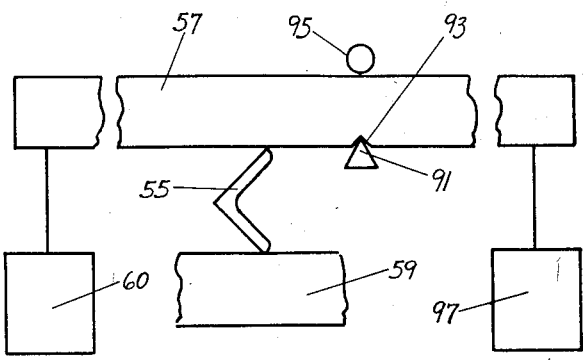
Fig. 4 is a diagrammatic view illustrating certain advantages involved in a feature of my invention.

In my early work I followed the practice of pivoting the beam on a knife edge 91 which engaged a notch 93 milled in the beam along its thickness dimension, as is illustrated in Fig. 4. Above the beam I provided a pin 95. Under these circumstances I found that while under certain loading conditions the beam 57 might rest on the knife edge 91, under other loading conditions the relationship between the forces applied to the beam are such that it lies against the pin 95. Such a situation occurs, for example, when the resultant moment arising from the forces applied to the beam has clockwise direction about the pivot region. When such a situation occurs after a change in gravitational load, the beam is disengaged from the knife edge 91 and engages the pin 95. The movement of the beam which thus arises renders the matter of producing a photoelastic print rather difficult and in particular enhances the difficulty involved in producing a photoelastic motion picture.

The difficulties discussed hereinabove might be to a certain degree eliminated by mounting a counterbalance 97 very near to the pivot region. However, the use of this remedy is attended with numerous disadvantages among which the most important arises from the fact that by reason of the heavy counter-weight 97 necessary, the upright assembly becomes unbalanced and may topple over easily. For this reason I have provided a novel support for the beam which I shall now describe.

In accordance with the preferred practice of my invention, conical bearings 99 are provided in the beam at two points preferably midway between its edges. In addition a yoke 100 consisting of a plurality of parallel plates 101 and 103 separated by blocks 105 is provided. The yoke 100 is mounted on the rectangular frame 33 and secured thereto by bolts 107 which pass through the plates and blocks and engage the openings 53 in the frame 33. Each of the parallel plates 101 and 103 is provided with a threaded opening 109 directly opposite to the region in which the beam 57 is to be supported, and a plurality of threaded studs 111 provided with conical points 113 to engage the conical bearings 99 in the beam 57 are screwed into the openings after the beam has been inserted in the yoke 100 and after the yoke has been mounted on the rectangular frame 33. The conical points 113 engage the bearings 99, and the beam 57 is pivoted with facility on the conical points and does not tend to vary its position as in the case discussed hereinabove.

It is to be noted that the yoke 100 is of such structure that the beam 57 may be removed therefrom without disengaging the yoke from the rectangular frame 33. This object is accomplished by unscrewing the studs 111 until the conical pivot points 113 are removed from the bearings 99. After this the beam 57 may be pulled through the yoke until it is disengaged therefrom.

Figure 7:
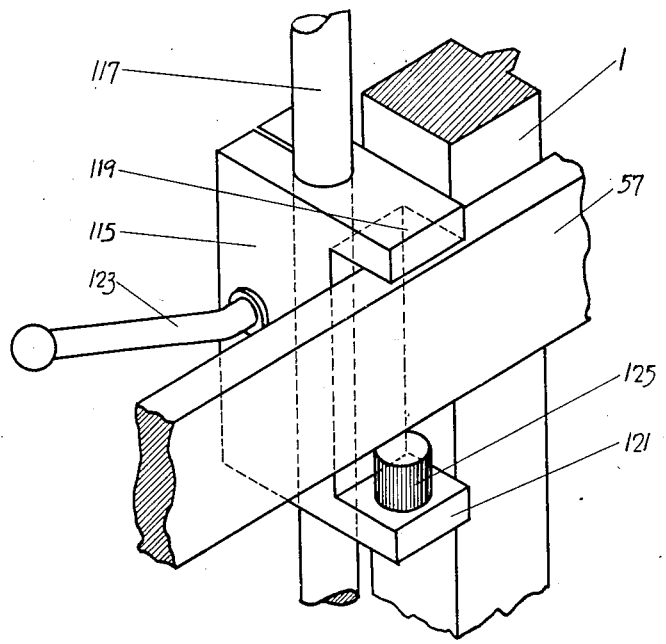
Fig. 7 is a view in perspective showing another feature of my invention.
Figure 8:
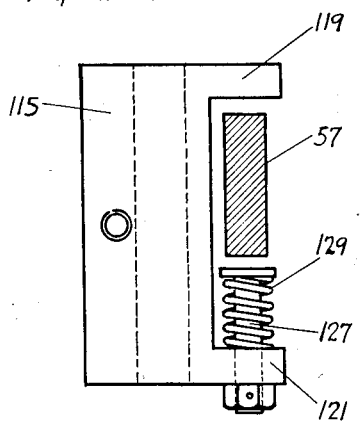
Fig. 8 is a view in side elevation showing a modification of the feature illustrated in Fig. 7.

To prevent the beam 57 from being suddenly precipitated on the table 13 or on the floor, I have provided a dog 115 which is slidably supported on a cylindrical bar 117 mounted parallel and adjacent to the upright support nearest the gravitational load. The dog is provided with upper and lower jaws 119 and 121 and may be secured in any position by turning a handle 123 and pinching the split rectangular portion thereof, along the bar 117, in such manner that the beam 57 passes between the jaws. The dog 115 may also be turned on the bar 117 at right angles to the above-described position in which case the beam 57 is parallel to the jaws. When the beam 57 passes between the jaws and the element under test 55 collapses under the stress of the load 60, the beam engages the lower jaw 121 and is prevented from falling to the floor. If, on the other hand, the load 60 is suddenly removed and the counterweights 71 become effective to pivot the beam, the upper jaw 119 is engaged; and the beam is prevented from falling to the floor. The lower jaw may be provided with a rubber stud 125 as is illustrated in Fig. 7 or with a slidably mounted stud 127 supported on a spring 129 as is illustrated in Fig. 8.

To provide for raising the central beam 57 after it has been loaded, when, for example, adjustment of the position of the element 55 is necessary, I have contrived a cam assembly 131 which is shown in detail in Figs. 9 and 10. The assembly 131 comprises a plurality of plates 133 and 135 held in a position parallel to each other by a cylindrical stud 137 at one end and by an eccentric cam 139 at the other. The cam assembly 131 is mounted on the frame 33 by the stud 137 which is secured in the outer plate 135 and passes through an opening in the plate 133 and engages an opening 53 in the frame and by a shaft 143 which passes through openings in the plates 133 and 135 and is secured to the cam 139 and engages an opening in the frame. A handle 145 is provided for rotating the cam.

The assembly 131 is so mounted in the rectangular frame 33 that the beam 57 passes between the cam 139 and the stud 137. Normally the cam is disengaged from the beam. When it is rotated into a position in which it engages the beam, it raises the beam and disengages it from the element 55.

The assembly 131 may be removed from the rectangular frame 33 without disturbing the beam by moving the outer plate 135 away from the frame 33, thus withdrawing the stud 137 from the opening 53 in which it is engaged and simultaneously disengaging the cam shaft 143 from the opening 53 in which it engages the frame. When the stud 137 is removed from the opening in the inner plate 133 the latter falls under gravity to a position in which it is suspended from the cam shaft 143. The assembly may then be removed by the simple process of removing what remains of the cam shaft 143 in the opening in the frame 33.

To facilitate the numerous adjustments which are essential in the proper practice of my invention, the upper, lower, and central beams 57, 59, and 61 are preferably provided with notches 147 which extend transverse to the upper and lower edges of the beams and are preferably uniformly spaced. Each beam is also provided with scales 149, and with openings 151 that are also preferably uniformly spaced along the beams. The openings may be utilized to advantage when it is desirable to apply the apparatus to the testing or the photoelastic analysis of an element 55 under tension. In such a case the element is held by brackets 153 secured in the openings in the beams and in openings in the element as is illustrated in Fig. 2.

When a testing machine constructed in accordance with my invention is utilized for the purpose of photoelastically analyzing an element 55, it is generally essential that the element be mounted in the proper vertical position with a high degree of accuracy. The manner in which this object is attained may most conveniently be explained by considering the situation which arises when an element under compression is analyzed. In such a case I utilize to advantage the notches 147 in the lower beam 59.

In accordance with my invention the element 55 is mounted on a platform 155 provided with legs 157 and with notches 159 in its lower surface to correspond with the notches 147 in the beam (Fig. 15). The platform 155 may also be provided with a scale or at least with a line 161 to indicate a position of reference. The element 55 is similarly marked, and it may be so mounted on the platform 155 that its central line corresponds with the line of reference 161. The platform 155 is disposed on the beam 59 in such manner that the legs 157 straddle the beam. The height of the element may be accurately adjusted by inserting pins 163 of proper dimensions between the co-extensive notches 147 and 159 of the platform and beam. In utilizing the apparatus a great variety of such pins 163 is provided, and a number of platforms 155 of different heights may also be provided. The element 55 may be positioned roughly at the proper height by selecting a suitable platform, and the finer adjustments may be made by selecting suitable pins.

For comparatively crude work the above-described arrangement yields sufficiently accurate results. However, I have found that if the photographs are prepared with the proper degree of care, they may be utilized in making quantitative determinations. In a properly prepared photograph the fringes produced by reason of the stresses in the element 55 are so definitely marked that by measuring the distance between them, the character and magnitude of the stresses may be determined with a high degree of accuracy. To produce photographs of this character, it is essential that the image of the element under test be well defined. To attain this object, it is essential that the surfaces of the element 55 through which the polarized radiation is to be transmitted shall be perpendicular to the beam of radiations.

In the preferred practice of my invention the radiations after being polarized are collimated in the usual manner by a lens 167 of the proper focal length properly disposed. After being so collimated, the radiations are projected on the surface of the element 55; and the radiations emitted by the surface of the element are focussed on the photographic negative.

To make certain that the surface of the element 55 is perpendicular to the beam of radiations, a screen 169 (Fig. 17) is positioned in a plane corresponding to the focal plane of the photographic plate (not shown); and the appearance of the image 171 is observed. If the image appears irregular and hazy at the edges it is certain that the element 55 is not properly positioned relative to the radiations. Under such circumstances, the position of the element is adjusted with apparatus, the functioning of which I shall now explain.

The element 55 is mounted on a bar 173 which in turn is pivotally supported on a platform 175 of the type discussed above. The platform 175 utilized in the present case is provided with a pin 177 which projects from its center and engages an opening in the lower surface of the bar 173, thus enabling the bar to turn in a horizontal plane. The bar 173 is, moreover, provided with a scale 179 and the element 55 is positioned centrally on the bar and held there by set screws 181, which pass through a plurality of brackets 183 straddling the bar adjacent to the ends of the element, and engage the element. Flanges 185 extend from the ends of the bar and are engaged by a plurality of screws 187 which traverse a plurality of upwardly extending projections 189 in the platform 175 that are parallel and opposite to the flanges. The angular position of the element 55 may be adjusted by turning with one screw 187 or the other as the necessities of the situation may require. The screws 187 in engaging the flanges 185 of the bar 173 cause it to pivot about the pin 177 on which it is mounted and to vary the angular position of the element. It is seen that the element may be adjusted in the proper angular position by observing the image 171 on the screen 169 and operating one or the other of the positioning screws until the image is sharply defined.

While in the preferred practice of my invention the beam of radiations is collimated before it is projected on the element under test, there are circumstances in which it may be desirable to project a converging or diverging beam of radiations on the element 55. In such a case the surface of the element is usually mounted normal to the axis of the beam.

When sharply defined photoelastic prints are desired, a further condition which is of extreme importance is that the stress shall be centrally applied to the element 55 and that the load shall be uniformly applied. To attain this object I have provided the apparatus shown in Figs. 21, 22, and 24.

An assembly composed of a plurality of parallel plates 193 separated by a block 195 extending between their upper ends and supporting a plurality of rollers 197 and 199 between their lower ends is slipped onto the beam 57 in such a manner that the block 195 is engaged by the upper edge of the beam. The parallel plates 193 are provided with bevel-edged openings 201 through which the scale 149 on the beam 57 can be seen, and the beveled edges are provided with marks 203 whereby the adjustment of the plate may be observed. The rollers 197 and 199 mounted in the lower portion of the plate assembly form a triangular aggregate separated by a block 205 of T section; two rollers 197 being fixed above the ends of the plates on each side and being adapted to engage the beam 57 when the plate is in position on the beam, and the third roller 199 projecting from the lower end of the assembly. The lower roller 199 rests on a plate 207 provided with an angular notch 209 along its length, and the plate 207 rests on another plate 211 also provided with a similar angular notch 213, in such a manner that the notches are co-extensive. The lower plate 211 rests on the upper end of the element 55 and the lower end of the element in turn rests either on the lower beam 59 or on the assembly discussed hereinabove.

A pin 215 is inserted to engage the co-extensive notches 209 and 213 in the plates; and as the plates 207 and 211 settle under the action of the load 60, the force of the load is uniformly distributed on the element to be tested and is not concentrated in a single region. The plates 207 and 211 are equipped with ends of semi-circular cross section and are held together by rectangular elements 216 provided with circular openings which are mounted over the ends.

Brackets 217 of U section are secured in the openings 151 of the beam 57 flanking the plates 193 on either side. The roller assembly is held in position by a set of plates 219 mounted on the sides of the U section brackets 217 and a second set of plates 221 projecting from the upper support 207 on which the assembly rests. Both sets of plates are equipped with slots 223 through which pins 225 mounted in the T block 205 in the roller assembly may pass, and the pins are utilized for the purpose of guiding the assembly as it is moved. The slotted plates 219 and 221 are provided on both sides of the beam as can be seen by examining the section shown in Fig. 24.

A plurality of adjusting screws 227 project through openings in the horizontal portions of the U brackets 217 and engage the sides of the roller assembly. The load may be centrally adjusted with reference to the element 55 by turning either one or the other of the screws 227 until the image of the element appears to have the proper symmetry on the viewing screen 169. When the screws are turned, the rollers roll along the plate 207 and beam 57 until the proper position is attained. By reason of the functioning of the notched plate and pin assembly, the stress is uniformly distributed as is illustrated in Fig. 23 (a) and not concentrated in one region or the other as is illustrated in Fig. 23 (b).

In the preferred practice of my invention, the beam 57 is loaded hydraulically as is illustrated in Fig. 25. In the apparatus shown in this view a tank 229 is suspended from the end of the beam 57. A rigid open pipe 231 projects from the lower end of the tank 229, and a flexible hose 233 engages the projecting end of the pipe. The remaining end of the hose 233 communicates with a T system of pipes composed of a common pipe 235 which may be fed from an inlet pipe 237 or feed an outlet pipe 239 depending on the condition of a valve (not shown) which is located at the junction point of the T. An operating mechanism 241 is provided for the valve. When the mechanism is in one position, the inlet pipe is open; and a liquid, preferably water, is being fed into the tank 229; when it is in second position, the valve is entirely closed; and the water in the tank is at a certain height; and when it is in third position, the drain is open; and the water flows out of the tank into the outlet.

By utilizing the tank 229 and the system of pipes for loading the beam, I am able to continuously load or unload the beam and to produce highly instructive photoelastic motion pictures of elements under stress. I am also able to accurately adjust the loading of the beam and to accomplish this object with considerable facility. A further important feature of my invention is shown in Figs. 26 to 31.

It often happens that the determination of the polarity of stress (i. e., whether it is tension or compression) at a particular point in the element 55 becomes essential. In general such a determination cannot be made simply by observing a photoelastic photograph or the photoelastic image of the element.

In accordance with my invention the determination is made by modifying the radiations transmitted through the element 55 by utilizing an auxiliary element 245 which is stressed in a known manner and is disposed adjacent to the former element in such manner that the radiations are transmitted through both elements. The auxiliary element 245 is, in accordance with the preferred practice of my invention, compressed and mounted in the region of the point under consideration.

Let it be assumed, for example, that the photoelastic analysis is being made with crossed polarizing and analyzing elements. In such a case if no stress exists at a point under consideration, i. e., if it is an isotropic point, the image of the point will be entirely black. Such a point is produced not only when polarized radiation is transmitted through a region under equalized stresses, but also by transmitting the radiation through successive elements under stresses of such polarity that one element compensates for the influence on the radiations of the other element. Thus if the beam of radiant energy is transmitted through a region under tension and is then transmitted through an auxiliary small element under compression, it is apparent that if the tension is equivalent to the compression and along the same line as the compression, the beam will emerge entirely unmodified; and a dark spot will appear on the screen. On the other hand if the auxiliary element disposed adjacent to the point under consideration is tensioned, the radiations will be modified in such a sense as to be more readily transmissible through the analyzing element, and the point under consideration will appear lighter on the screen than in the absence of the auxiliary element. The above discussed principles may be utilized in the analysis under consideration.

In practicing my invention the auxiliary element 245 is disposed adjacent to the element 55 in the region of the point to be viewed and is compressed. If the image of the region appears darker after the compression than before the compression, it is at once apparent that the main element is under tension in the region analyzed. If on the other hand the image of the region appears lighter or colored as it sometimes appears, it is apparent at once that the region in question is under compression.

To carry out the test involved with facility,

I have provided a bar 246 which engages V grooves extending internally along the length of the blocks 41 of rectangular frame 33. The bar 246 is provided with a removable end 247 which is joined to the main portion by a pin 249 extending through central openings in the main portion of the bar and in the removable end. The opening in the main portion of the bar 246 is countersunk to a considerable depth, and a compression spring 251 is coiled about the pin 249 and is inserted in the countersunk opening. The ends of the spring 251 engage the flange of the countersink in bar 246 and the extended end 247 causing the beveled edge 253 of the extended end to engage the V groove and to firmly hold the bar 246 in any desired horizontal position.

The auxiliary element 245 is mounted in rectangular plate 255 having a hollow cylindrical extension 257 and provided with an opening coextensive with the opening in the extension. The element 245 is preferably supported centrally in the opening between brackets 259 and 260 of C section and rests against pins 261 mounted in the brackets. The upper bracket 259 is supported on a lever 263 pivotally mounted on the rectangular plate 255. A threaded rod 265 secured to the free end of the lever 263 projects down into an opening in the rectangular plate 255 and is engaged by the threads of a hollow screw 267, the knurled head 269 of which projects from the bottom of the plate. When the knurled head 269 is turned, the bar is pivoted; and the auxiliary element 245 is compressed between the pins 261 in varying degrees.

It is apparent that if desirable the pins 261 in the brackets 259 and 260 may engage openings in a properly designed auxiliary element 245, and the element may thus be tensioned rather than compressed. It is also apparent that the pressure or tension impressed on the element 245 may be transmitted through a spring to an "Ames" dial, and thus an approximate value of the tension or compression required to entirely balance tension or compression at a point in the element 55 may be determined.

The auxiliary element 245 is, moreover, suspended between two sets of rods 271 and 273 mounted in the rectangular plate 255 transverse to the element. One rod 271 of each set is provided with threads to engage an internally threaded opening in a nut 275 rotatably secured in the plate 255. By rotating the nut 275 engaged with either rod 271, the angular position of the auxiliary element 245 is adjusted.

A bracket 277 provided with an opening to engage the cylindrical extension of the plate 255 and with a projection 279 of J section extending laterally therefrom is mounted on the cylindrical extension. The plate 255 and its appurtenant elements may be mounted in the frame 33 by engaging the J projection with the bar 246 and suspending the assembly therefrom. When the assembly is thus suspended from the bar 246, the auxiliary element 245 may be mounted behind the element 55. By rotating the rectangular plate 255, the angular position of the element 245 with reference to the element 55 may be adjusted. In addition it may with facility be inserted or removed from the apparatus, or it may be raised to such a position as not to interfere with other operations.

Although I have shown and described a certain specific embodiment of my invention, I am fully aware that many modifications thereof are possible. My invention, therefore, is not to be restricted except in so far as is necessitated by the prior art and the spirit of the appended claims.

I claim as my invention.

1. Apparatus for photoelastically testing an element of the type capable of changing the polarization properties of radiation projected thereon in accordance with the changes in the stress set up therein, to make a quantitative determination of said stress, comprising means for supporting said element, means for producing an image of said element on a predetermined plane, said means including means for projecting a collimated beam of polarized radiation on said element, fine adjustment means for adjusting the position of said element in such manner that the surface thereof that is to be imaged is, with a high degree of accuracy, normal to the rays of said beam of radiations and means for stressing said element to produce an image of said element showing the quantitative effect of the stress set up in said element on said radiations.

2. Apparatus for photoelastically testing an element of the type capable of changing the polarization properties of radiation projected thereon in accordance with the changes in stress set up therein, to make a quantitative determination of said stress, comprising means for supporting said element, means for producing an image of said element on a predetermined plane, said means including means for projecting a beam of polarized radiations on said element and fine adjustment means for adjusting the position of said element in such manner that the surface thereof that is to be imaged is, with a high degree of accuracy, normal to the axis of said beam of radiations and means for stressing said element to produce an image of said element showing the quantitative effect of the stress set up in said element on said radiations.

3. Apparatus for photoelastically testing an element of the type capable of changing the polarization properties of radiation projected thereon in accordance with the changes in the stress set up therein, to make a quantitative determination of said stress, comprising means for producing an image of said element in a predetermined plane, said means including means for projecting a beam of polarized radiations, means supported on a pivot perpendicular to the axis of said beam of radiations for supporting said element in the path of said beam of radiation and fine adjustment means for rotating said supporting means whereby said element may be so positioned that the surface thereof that is to be imaged is, with a high degree of accuracy, normal to the axis of said beam of radiations and means for stressing said element to produce an image of said element showing the quantitative effect of the stress set up in said element on said radiations.

4. Apparatus for determining the properties of an element under the influence of given forces, said element being of the type capable of changing the polarization properties of radiation projected thereon in accordance with the changing stress set up therein, comprising means for projecting a beam of polarized radiation on said element while under the influence of said forces, means for observing the effect of said element in modifying the polarization properties of said beam of radiant energy, and means for adjustably supporting another element, having optical properties related to the optical properties of the element under test, immediately adjacent to said element under test and so near thereto that said beam from said radiation projecting means passes through both said elements without the intervention of additional optical means, said supporting means including means for stressing said other element, and supporting it for movement into or out of optical alignment with said element under test in such manner that the element under test may influence the beam of radiant energy together with said other element or independently thereof.

5. Apparatus according to claim 4 characterized by that the area of the surface of the other element on which the radiant energy is to be projected is small compared to the area of the corresponding surface of the element under test, and the supporting means includes means for positioning said other element in such manner that it is oriented in a predetermined manner relative to any desired region of the surface of the element under test.

6. Apparatus for producing photoelectric stress patterns for a transparent structural element of the type capable of changing the polarization properties of a beam of radiant energy transmitted therethrough, comprising means for projecting a beam of polarized radiant energy on said element, means for applying a load to said element, said load-applying means including a body of circular cross-section through which said load is applied, means for moving said body relative to said element to shift the line of action of said load and thereby to adjust the line of action of said load, and means for observing the changes in the polarization properties of the radiant energy transmitted through said element, arising from said load.

7. Apparatus for producing photoelastic stress patterns for a transparent structural element of the type capable of changing the polarization properties of a beam of radiant energy transmitted therethrough comprising means for projecting a beam of polarized radiant energy on said element, means for applying a load to said element, said load applying means including a body of circular cross-section through which said load is applied, means for rolling said body relative to said element to shift the line of action of said load and thereby to adjust the line of action of said load, and means for observing the changes, in the polarization properties of the radiant energy transmitted through said element, arising from said load.

8. Apparatus for producing stress patterns for a transparent structural element of the type capable of changing the polarization properties of radiant energy transmitted therethrough in accordance with the changes in stress set up therein, comprising means for applying a load to said element, said load-applying means including an assembly through which the load is transmitted and which comprises a plurality of grooved members, the grooves being opposite to each other and coextensive with each other to form a seat and at least one body having a circular cross section seated in said groove in such manner as to allow the lower member to rotate, means for projecting a beam of polarized radiations on said element, and means for so adjusting the load applied to the element that the stresses produced by the load are with the aid of said assembly maintained uniform in a direction parallel to the axis of propagation of said beam.

9. Apparatus for photoelastically testing a transparent element of the type capable of changing polarization properties of radiation transmitted therethrough in accordance with the changes in the stress set up therein, to make quantitative determination of said stress, comprising means for supporting said element, means for producing an image of said element on a predetermined plane, said means including means for transmitting a collimated beam of polarized radiations through said element and fine adjustment means for rotating said element in such manner as to dispose the surface thereof that is to be imaged, with a high degree of accuracy, normal to the rays of said beam of radiation and means for stressing said element to produce an image of said element showing the quantitative effect of the stress set up in said element on said transmitted radiation.

10. Photoelastic testing apparatus for an element of given structure, said element being of the type capable of changing the polarization properties of radiant energy projected thereon in accordance with the changes in the stress set up therein, comprising means for subjecting said element to stress, means for projecting a beam of polarized radiations on said element, means for disposing another element, having optical properties similar to said first-mentioned element and having a predetermined structure, in the path of said radiations, immediately adjacent to said first element and so near thereto that said beam traverses both said elements without the intervention of optical means, means for subjecting said last-named element to stress of a known character and means for observing the optical influence of both said elements on said beam of radiations.

MAX M. FROCHT.